(12) United States Patent
Leta et al.

(10) Patent No.: US 9,186,626 B2
(45) Date of Patent: Nov. 17, 2015

(54) SEPARATION OF $CO_2$ AND $H_2S$ USING SUPPORTED AMINES

(71) Applicants: Daniel P. Leta, Flemington, NJ (US); Jack W. Johnson, Clinton, NJ (US); Ni Zheng, Vienna, VA (US); Harry W. Deckman, Clinton, NJ (US)

(72) Inventors: Daniel P. Leta, Flemington, NJ (US); Jack W. Johnson, Clinton, NJ (US); Ni Zheng, Vienna, VA (US); Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 191 days.

(21) Appl. No.: 14/078,860

(22) Filed: Nov. 13, 2013

(65) Prior Publication Data

US 2014/0161697 A1 Jun. 12, 2014

Related U.S. Application Data

(60) Provisional application No. 61/735,683, filed on Dec. 11, 2012.

(51) Int. Cl.
*B01D 53/52* (2006.01)
*B01D 53/62* (2006.01)
(Continued)

(52) U.S. Cl.
CPC ............. *B01D 53/526* (2013.01); *B01D 53/52* (2013.01); *B01D 53/62* (2013.01); *B01D 53/025* (2013.01); *B01D 53/80* (2013.01);
(Continued)

(58) Field of Classification Search
CPC ............. B01D 53/14; B01D 53/1462; B01D 53/1468; B01D 53/1475; B01D 53/526
See application file for complete search history.

(56) References Cited

U.S. PATENT DOCUMENTS 7,795,175 B2 * 9/2010 Olah et al. ............... 502/401
7,846,240 B2 12/2010 Gal et al.
(Continued)

FOREIGN PATENT DOCUMENTS

WO 2009108064 A1 9/2009

OTHER PUBLICATIONS

International Search Report with Written Opinion for PCT/US2013/069812 dated Feb. 17, 2014.
(Continued)

*Primary Examiner* — Timothy Vanoy
(74) *Attorney, Agent, or Firm* — David M. Weisberg; Andrew T. Ward

(57) ABSTRACT

Methods are provided for removing $CO_2$ and/or $H_2S$ from a gas phase stream, such as a refinery flue gas stream, a coal-fired or petroleum-burning power plant, or a natural gas stream. A gas phase stream containing $CO_2$ and/or $H_2S$ can be contacted under effective conditions with an aqueous slurry of supported amine particles. The $CO_2$ and/or $H_2S$ can react with the supported amines to form bicarbonates, carbonates, carbamates, sulfide salts, or other species. Because the amine is part of, bonded to, or otherwise supported on a particulate substrate, the reaction product from the amine reaction can also remain bound to the particle. After reacting supported amines with $CO_2$ and/or $H_2S$ captured from a gas stream, the supported amines particles can be separated from the aqueous slurry environment for regeneration of the supported amine and release of the $CO_2$ and/or $H_2S$.

19 Claims, 1 Drawing Sheet

(51) Int. Cl.
  *B01D 53/02* (2006.01)
  *B01D 53/80* (2006.01)
(52) U.S. Cl.
  CPC .... *B01D 2252/204* (2013.01); *B01D 2253/202* (2013.01); *B01D 2253/206* (2013.01); *B01D 2253/25* (2013.01); *B01D 2257/304* (2013.01); *B01D 2257/504* (2013.01); *B01D 2258/0283* (2013.01); *B01D 2259/126* (2013.01); *Y02C 10/04* (2013.01)

(56) References Cited

U.S. PATENT DOCUMENTS

| | | | |
|---|---|---|---|
| 8,470,074 B2* | 6/2013 | Baugh et al. | 95/139 |
| 8,598,071 B1* | 12/2013 | Baugh et al. | 502/407 |
| 2010/0303694 A1 | 12/2010 | Aines | |
| 2011/0059845 A1 | 3/2011 | Fryxell et al. | |
| 2011/0308390 A1* | 12/2011 | Perry et al. | 95/236 |
| 2012/0171095 A1* | 7/2012 | O'Brien et al. | 423/228 |
| 2012/0288429 A1 | 11/2012 | Fan | |
| 2012/0308457 A1* | 12/2012 | Yoon et al. | 423/228 |

OTHER PUBLICATIONS

Langeroudi et al., "Grafted Amine/CO2 Interactions in (Gas-)Liquid-Solid Adsorption/Absorption Equilibria", Journal of Physical Chemistry C, Dec. 3, 2009, vol. 113, No. 52, pp. 21866-21876, ACS Publications.

* cited by examiner

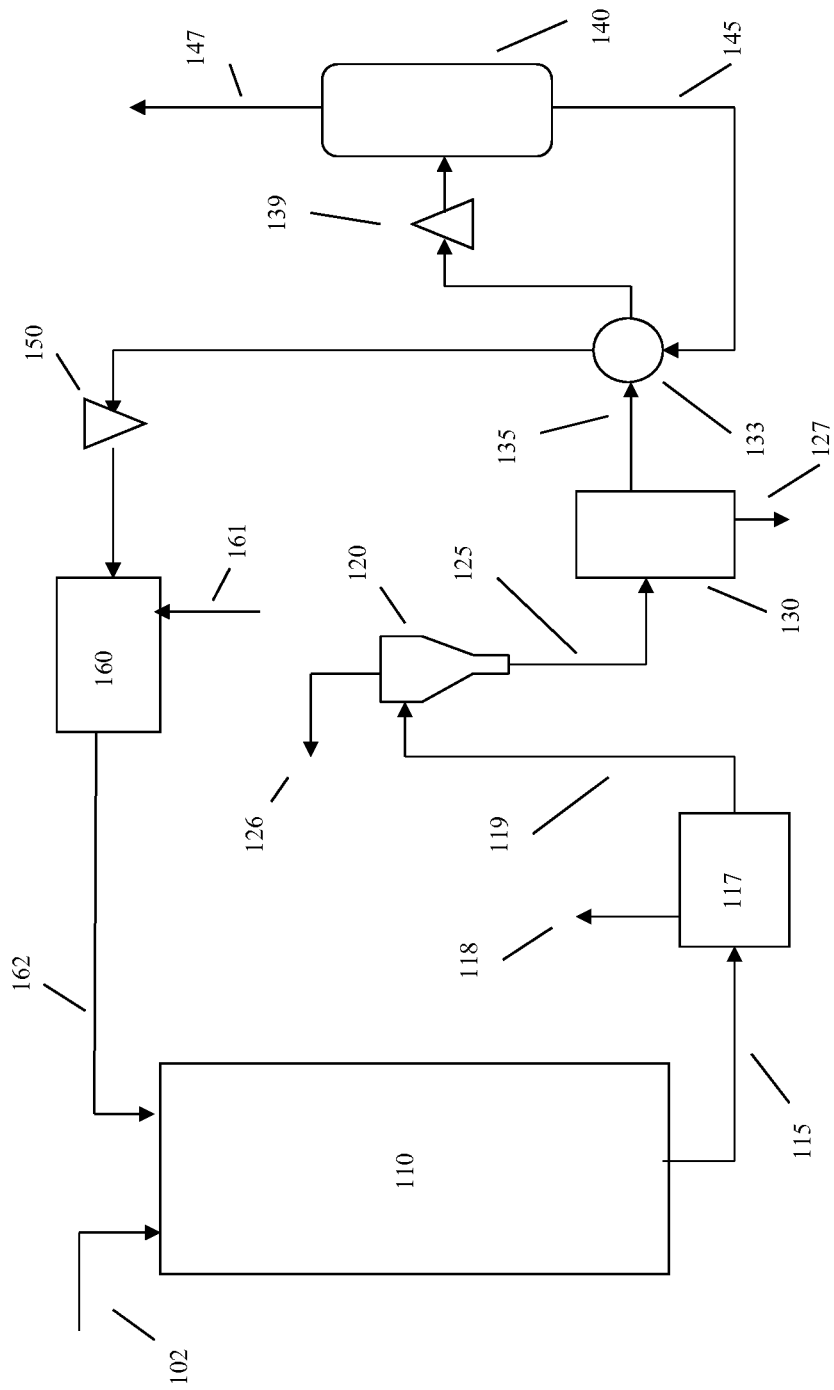

SEPARATION OF CO₂ AND H₂S USING SUPPORTED AMINES

CROSS-REFERENCE TO RELATED APPLICATIONS

This application claims the benefit of U.S. Application Ser. No. 61/735,683, filed on Dec. 11, 2012; which is incorporated by reference herein in its entirety.

FIELD OF THE INVENTION

Supported amines are used for removal of $CO_2$ and $H_2S$ from gas flows.

BACKGROUND OF THE INVENTION

In conventional amine contacting systems, an aqueous solution of dissolved amines is contacted in a counter current manner with a gaseous stream containing $CO_2$ and/or $H_2S$. The gases to be separated react with the solubilized amines at a temperature range of about 30° C. to about 60° C. The "rich" solution of amines reacted with $CO_2/H_2S$ is then heated with steam stripping to a temperature range of about 110° C. to about 140° C. in order to release the $CO_2$ and/or $H_2S$. In such conventional processing a significant amount of energy is required to heat the entire rich aqueous solution. While feed/product heat exchange for the stripping step is normally utilized, such heat exchangers significantly affect the capital cost of the system, often dictating the maximum amine circulation rate that can be utilized.

U.S. Pat. No. 7,846,240 describes a chilled ammonia based $CO_2$ capture system. $CO_2$ is adsorbed using an ammonia solution or slurry at a temperature below ambient. If a slurry is used, the particles in the slurry correspond to particles of ammonium carbonate and/or bicarbonate that have precipitated in the solution. When a slurry is used, the carbon capture and release mechanism is based on consumption and generation of $CO_2$ as the particles convert between carbonate and bicarbonate forms. In addition to maintaining the ammonia at a below ambient temperature, preventing loss of ammonia in exhausted flue gas is also a concern.

An article by Langeroudi et al. (Journal of Physical Chemistry C, 2009, Vol. 113, pp. 21866-76) describes $CO_2$ solubility experiments performed on aqueous slurry solutions of silica particles including grafted amines. The solubility experiments included exposing the slurry solutions to various partial pressures of $CO_2$ in a static reaction vessel.

SUMMARY OF THE INVENTION

In one aspect, a method for performing a gas separation is provided. The method includes contacting a gas stream comprising $CO_2$ and/or $H_2S$ with an aqueous slurry of supported amine particles under effective conditions for capturing at least one of $CO_2$ and $H_2S$ to form a slurry of supported amine particles enriched in $CO_2$ and/or $H_2S$; separating the supported amine particles from at least a portion of the aqueous slurry liquid; exposing the separated supported amine particle to effective conditions for release of a release gas, the release gas comprising at least a portion of the captured $CO_2$ and/or $H_2S$, the effective conditions for release including a temperature of about 80° C. to about 200° C.; and combining the supported amine particles with aqueous slurry liquid to form a second aqueous slurry of supported amine particles.

In another aspect, a method for performing a gas separation is provided. The method includes contacting a gas stream comprising $CO_2$ and/or $H_2S$ with an aqueous slurry of supported amine particles in a co-current manner under effective conditions for capturing at least one of $CO_2$ and $H_2S$ to form a slurry of supported amine particles enriched in $CO_2$ and/or $H_2S$; separating the supported amine particles from at least a portion of the aqueous slurry liquid; exposing the separated supported amine particle to effective conditions for release of a release gas, the release gas comprising at least a portion of the captured $CO_2$ and/or $H_2S$, the effective conditions for release including a temperature of about 100° C. to about 140° C. and a pressure of about 2 barg (about 200 kPag) to about 10 bar (about 1 MPag); and combining the supported amine particles with aqueous slurry liquid to form a second aqueous slurry of supported amine particles, at least a portion of the second aqueous slurry of supported amine particles being used as the aqueous slurry of supported amine particles for said contacting of the gas stream, wherein the effective conditions for capturing at least one of $CO_2$ and $H_2S$ comprise a temperature at least about 60° C. lower than the temperature of the effective conditions for release.

BRIEF DESCRIPTION OF THE DRAWINGS

FIG. 1 schematically shows an example of a reaction system according to an embodiment of the invention.

DETAILED DESCRIPTION OF THE EMBODIMENTS

Overview

In various aspects, methods are provided for removing $CO_2$ and/or $H_2S$ from a gas phase stream, such as a flue gas stream from a refinery, a coal fired or petroleum burning power plant, or a natural gas stream from a natural gas field. A gas phase stream containing $CO_2$ and/or $H_2S$ can be contacted under effective conditions with an aqueous slurry of supported amine particles. The $CO_2$ and/or $H_2S$ can react with the supported amines to form bicarbonates, carbonates, carbamates, sulfide salts, and/or other species. Because the amine is part of, bonded to, or otherwise supported on a particulate substrate, the reaction product from the amine reaction can also remain bound to the particle. In the discussion herein, supported amines can advantageously include amines that are part of a substrate particle, such as amines that are part of a resin used to form resin particles. Such amines can advantageously be included within the definition of a supported amine even though the particle may only be composed of a compound (or compounds) for forming the particle.

After reacting supported amines with $CO_2$ and/or $H_2S$ captured from a gas stream, the supported amines particles can be separated from the aqueous slurry environment for regeneration of the supported amine and release of the $CO_2/H_2S$. Because the reacted amine products can be supported on the substrate or support particles (including being functional groups of a compound for forming the support particles), the amount of aqueous slurry liquid staying with the amine products during regeneration can be reduced/minimized relative to a conventional solution phase system, where the entire solution would be passed to the $CO_2$ release stage. By reducing/minimizing the amount of water (or other liquid) travelling with the reacted amine product, the amount of cooling and reheating of slurry liquid associated with capture and regeneration can be reduced/minimized, in comparison with a conventional solution phase system. Instead, heating and cooling can be performed primarily on the supported amines.

The supported amines can also provide one or more advantages relative to conventional slurry systems, where the slurry particles correspond to precipitated reaction products of an ammonia-$CO_2$ reaction. In such conventional slurry systems, the entire $CO_2$-containing flue gas may need to be chilled to below ambient temperature prior to contacting the ammonia slurry/solution. By contrast, the supported amines can be exposed to a $CO_2$-containing flue gas at a convenient temperature near to or above ambient, so that any necessary cooling, if any at all, of a flue gas prior to the $CO_2$ capture stage can be performed using less expensive techniques, such as heat exchange with another process stream.

Supported Amines

In various embodiments, supported amines can be used as a key component of the reactive agent for adsorption of $CO_2$ and/or $H_2S$ from a gas stream. The supported amines can include particles of a support material and one or more amines. The amines can comprise or be: functional groups of compounds used to form the support material; functional groups of a compound bound to the surface of the support material; and/or functional groups of a compound having a sufficiently low volatility to remain attached to/associated with the support during the capture and release/regeneration processes.

The support material for the grafted amine can be a porous support that has a sufficient density and durability to be suitable for separation from a slurry, such as by using a cyclone separator. Porous silica is an example of a support material that can be separated from a slurry, such as by using a cyclone, and that can also have sufficient durability to allow for recycling multiple times. Another option can include particles of porous resins, such ion exchange resins and/or other amine resins. It is noted that a porous resin with amine functionality may be able to serve as an amine for capturing $CO_2$ and/or $H_2S$ without requiring bonding, grafting, or otherwise supporting an additional amine to the particle. Alternatively, the amines in a porous amine resin can supplement other amines supported on the particle.

The particles can have any convenient morphology, such as (roughly) spherical, (roughly) cylindrical, or other morphologies available and/or typically used for particulate supports. The particles can have a minimum dimension of at least about 50 µm, with dimensions from about 50 µm to about 3 mm being suitable. At least one dimension can be at least about 100 µm, so that, for spherical type particles (such as beads), the characteristic size can be from about 100 µm to about 3 mm. A characteristic particle size of about 1 mm can be suitable for various embodiments.

One potential issue for supported amines can be loss of amine functionality to the surrounding aqueous slurry environment. This potential problem can be reduced/minimized for amine functional groups that are part of the support material, such as a particle formed from an amine resin. For grafted amines, at least some loss of the grafted amine functionality may occur during the initial exposure of a support (including the grafted amine) to an aqueous environment. This initial loss of amine can be reduced/minimized by selecting amine compounds with higher support grafting stability.

As noted above, one option for providing an amine for capture and release of $CO_2$ and/or $H_2S$ can include using an amine resin for the particle. Another option can include using an amine bonded/grafted to a support particle. For example, for a silica based support particle, amines can be grafted to a support particle via a siloxane linkage. One option for forming a siloxane linkage can be to start with an alkoxysilylalkyl molecule with at least one, and preferably two or more, alkoxy chain(s) attached to the silicon atom. At least one amine functional group can be included in an alkyl side chain. One or more alkoxy side chains can be exchanged with an —OH group from an Si—OH moiety on the surface of the support particle. This can result in an $Si_{surface}$—O—$Si_{amine\ group}$ bond, such that the amine-containing compound can be grafted to the surface. In some embodiments, an amine compound grafted to the surface can include two or three $Si_{surface}$—O—$Si_{amine\ group}$ bond linkages. By chemically bonding/grafting the amines to the support particles, the amines can remain with the support particle during capture and regeneration processes. Examples of amines for grafting on to a particle (such as to form a siloxane linkage) can include, but are not necessarily limited to, alkoxysilylalkyl molecules bearing amine groups such as primary amines, secondary amines, and di- and tri-functional amines (such as ethylenediamine and diethylenetriamine, for example).

Still another option can include using an amine that can be substantially insoluble or that can have relatively low (minimal) solubility in water and that can also have a relatively low vapor pressure (at operational conditions). Examples of such amines can include, but are not necessarily limited to, polymeric amines and/or amines that can be lightly or moderately cross-linked to form a higher molecular weight amine with suitably low solubility and vapor pressure. It is noted that a highly cross-linked amine could result in a particle where the amines thereon correspond to only one or a few individual polymer molecules. An example of a suitable amine can include a branched polyethyleneimine formed by polymerization of a compound such as aziridine on the surface of a support particle. For aziridine, the linkage to the surface can be in the form of an $Si_{surface}$—O—$C_{amine\ group}$ bond, as described in U.S. Pat. No. 8,298,986.

Gas Feeds

The supported amine slurries described herein can be used to perform separations on a variety of gas phase feeds. One example of a gas phase feed can include a natural gas feed/stream, such as a natural gas feed produced at a petroleum production site, or a natural gas feed/stream from a gas field or shale gas formation. Natural gas feeds can typically contain methane, optionally some larger hydrocarbons such as $C_2$-$C_4$ hydrocarbons, $CO_2$, and optionally one or more additional components such as $N_2$, $H_2S$, $H_2O$, mercaptans, and the like. The $CO_2$ and/or $H_2S$ components can be separated out from the desired hydrocarbons, e.g., via their association with (adsorption by) the supported amine slurries.

Other examples of gas feeds can correspond to flue gas streams from power generation plants, such as power plants or turbines driven by combustion of coal, petroleum, natural gas, and/or other hydrocarbons. For example, some coal-fired power plants or gas-powered turbines can generate as much as 50 kg of $CO_2$ per second. This $CO_2$ can be exhausted as part of a flue gas, with the $CO_2$ concentration being about 20 vol % or less, depending on the type of power plant. Coal-fired power plants can tend to relatively higher $CO_2$ concentrations within that range, such as about 15 vol %, while gas-powered turbines can have relatively lower concentrations, such as closer to about 4-5 vol %. This can correspond to up to about 1100-1150 moles of $CO_2$ per second.

Still another example of a suitable gas phase feed can include an output gas by-product (such as a potential fuel gas) from a refinery process. A variety of refinery processes can generate a gas phase output that can include both $CO_2$ and $C_1$-$C_4$ hydrocarbons such as $CH_4$. Depending on the type of refinery process, the output gas stream may also contain $H_2S$, $H_2$, $N_2$, $H_2O$, and other components that are in the gas phase at standard/operating conditions. The $CO_2$ (and/or $H_2S$) components can be separated out from the remaining output gas stream components using the supported amine slurries. This can increase the value of the remaining output gas stream components for use, for example, as a fuel gas within the refinery, while also allowing potential contaminants and/or greenhouse gases to be captured/sequestered.

Preferably, regardless of the source of a $CO_2$-containing gas stream, the gas stream can have an $SO_x$ content of about 100 ppb or less. For a $CO_2$-containing stream with a higher $SO_x$ content, the $SO_x$ content can be reduced to a suitable level using an $SO_x$ cleanup system and/or guard bed prior to being contacted with the supported amines according to the invention.

Capture and Release of $CO_2$ and/or $H_2S$ with Supported Amines

Various general reaction mechanisms for reactions of $CO_2$ and/or $H_2S$ with amines in a solution have previously been characterized. Typical reactions between amines (including ammonia) and $CO_2$ are known to form bicarbonates, carbonates, and carbamates as reaction products. Typical reactions between amines (including ammonia) and $H_2S$ are known to form bisulfides. These reaction products can have varying relative stabilities, depending on the nature of the amine(s).

In various embodiments, one benefit of using supported amines can be to provide similar types of reactivity to amines in solution during the capture phase, while reducing/minimizing the amount of material that changes temperature in order to facilitate release. The reactions between the supported amines and $CO_2$ and/or $H_2S$ are believed to be analogous to the reactions for similar amines in solution. Thus, it is believed that the nature of the amine as a primary, secondary, or tertiary amine and the steric factors for a given amine can be analogous for supported versus unsupported amines.

While supported amines are believed to provide comparable reactivity for capturing $CO_2$ and/or $H_2S$, in comparison with an amine solution, supported amines can offer one or more advantages during the subsequent release/regeneration phase of a carbon or sulfur capture process. One potential advantage can include reducing the amount of heating and/or cooling performed on the medium (water) used for the slurry, as compared to the heating/cooling requirements for a conventional solution phase process. In a typical amine based capture process in the solution phase, the amines generally remain in solution during the entire process. In order to manipulate the temperature of the amines during capture and release, at least a portion (and possibly all) of the solvent can often need to be additionally chilled or heated at various times. As a result, substantial quantities of energy can be expended for heating and/or cooling of the surrounding solvent. Additionally, heat transfer requirements may impose limitations on the circulation rate for amines between capture and regeneration.

By contrast, various embodiments can allow for capture and release of $CO_2$ and/or $H_2S$, while reducing/minimizing the amount of liquid undergoing a temperature change. Instead, the temperature changes for driving the capture and release reactions can be primarily focused on the amines and the corresponding support particles. Because the amines are supported on particles, the amines and corresponding particles can be substantially separated from the liquid for the slurry during the release/regeneration portion of a process. For example, an initial separation step can be based on using a cyclone separator to separate supported amine particles from a slurry. After the cyclone separation, an additional optional dewatering can be performed on the supported amine particles, such as be blowing, draining, or otherwise dewatering. Due to the expected lower heat capacity of the supported amine particles relative to the heat capacity of water (medium/solvent), removal of the aqueous portion of the slurry can reduce/minimize the amount of energy expended on changing the temperature of the slurry during regeneration as compared to a conventional solution phase process. It is noted that, due to the heat generated during adsorption of $CO_2$ and/or $H_2S$ by an amine functional group, some cooling of the liquid for the supported amine slurry may be beneficial.

In addition to reducing the amount of energy for temperature control, using a supported amine can allow for a higher utilization rate for the amine moieties in the slurry. In a conventional non-supported amine reaction, a variety of factors other than capture and release of $CO_2$ (and/or $H_2S$) can impact the capture/release conditions. One consideration can include controlling the capture/release processes, so that the desired phase can be maintained during/throughout the process. For example, if a solution phase process is desired, the temperature and other process conditions can be selectively controlled to avoid formation of precipitates in the solution. Similarly, if portions of the process are designed to operate as a slurry of participate particles, the conditions can be controlled to avoid dissolution of the participate particles into the surrounding liquid. These constraints on conditions can typically act as a corresponding constraint on the amount of amines that can effectively participate in the capture/release cycle. In practice, at least a portion of the amines can act as spectators, either remaining bound with $CO_2$/$H_2S$ throughout the process or remaining unreacted during the process.

Another process constraint can include avoiding loss of amines to the flue gas during the regeneration step. Many types of amines suitable for capture/release processes can have a meaningful vapor pressure at the temperatures used for either capture or release. This can unfortunately result in an equilibrium vapor pressure of the amine forming in the capture and/or release portion of the processing system. This vapor phase amine can be exhausted from the reaction system along with the $CO_2$ (and/or $H_2S$), thus indicating the preferable presence of additional components in the processing system to avoid loss of the amine functionality via the vapor pressure.

By contrast, supported amines are not believed to be as susceptible to phase change under the capture/release conditions. As noted above, some loss of supported (grafted) amines may occur during their initial exposure to the (aqueous) (aqueous) medium/solvent environment. After that initial exposure, however, the amount of amine loss to the solution can be reduced/minimized. For amines that remain after the initial exposure, they can be an integral part of the support and/or can have a sufficiently low solubility and/or vapor pressure under the capture/release conditions so that the process conditions may not be unnecessarily constrained by concerns about loss of amine functionality, e.g., to the gas phase. As a result, the process conditions for capture/release can be selected to improve/maximize the loading of amines during the capture phase and/or to improve/maximize release during the regeneration phase. In various embodiments, a gas stream containing $CO_2$ and/or $H_2S$ exiting from the release stage of the process can have an amine content (including ammonia) of about 100 wppm or less.

The amine content of gas stream(s) exiting the capture stage can optionally also be low, relative to a conventional capture/release process. In some embodiments, the amine content (including ammonia) of the gas stream exiting the capture stage after contacting the supported amine particles can be about 100 wppm or less. Additionally or alternately, if the gas stream contacting the supported amine particles has an amine content (including ammonia) of greater the 100 wppm prior to contacting, the gas stream exiting the capture stage after contacting can have an amine content (including ammonia) less than 20% greater than the amine content of the gas stream prior to contacting.

In various embodiments, a reaction system can be used to receive a feed containing $CO_2$ and/or $H_2S$, to expose the feed to a slurry of supported amines during a capture process, to transfer the supported amines rich in $CO_2$ and/or $H_2S$ to a regeneration volume/process, to regenerate the supported amines by releasing captured species, and then to transfer the regenerated supported amines back to the capture volume/process.

In the capture process, a feed containing $CO_2$ and/or $H_2S$ can be contacted with a slurry of supported amine particles. The contacting of the feed with the supported amine particles can be co-current or counter-current. Any convenient contacting method for contacting a gas stream with a slurry can be used. The temperature during contacting can be selected to facilitate capture of $CO_2$ and/or $H_2S$ by the supported amines. Examples of suitable temperatures can range from about 20° C. (or ambient) to about 80° C., including at least about 30° C. and/or less than about 65° C. The pressure during contacting can be selected to facilitate the capture reactions, such as a total pressure of about 0.8 bara (80 kPaa) to about 1.5 bara (150 kPaa). Because a supported amine is being used, a partial pressure of the corresponding gas phase amine can be unnecessary.

After the capture process, the slurry can advantageously be enriched in captured $CO_2$ and/or captured $H_2S$. The particles from the enriched slurry can then be transferred to the recovery volume/process. As an initial step, the slurry can be passed into a separation device for separating at least a portion of the liquid in the slurry from the particles. The particles can be separated from the liquid using a cyclone separator, a centrifuge, and/or another type of process capable of separating solid particles from a liquid. The separation process can remove a majority of the water from the solid particles. However, for some types of separation processes such as cyclone separation, some water may be entrained with the flow of particles out of the separator. This additional water can optionally be removed from the particles using other physical techniques, such as blowing a non-reactive gas stream through the particles, gravity draining, and/or another dewatering process.

After separating the liquid portion of the slurry from the particles, the captured $CO_2$ and/or $H_2S$ can then be released from the supported amine particles. The release process can be performed in the optional dewatering process space and/or in a separate volume. The release process can be facilitated by heating the particles to a temperature sufficiently above the capture temperature range, e.g., from about 80° C. to about 200° C., including at least about 110° C. and/or less than about 140° C. Indeed, the temperature for the release process can be at least about 50° C. greater, e.g., at least about 60° C. greater or at least about 75° C. greater, than the temperature of the contacting process. Since little or no liquid from the slurry needs to be heated, the heat transfer requirements for heating the amines can be advantageously reduced. As a result, the temperature for release can be selected based a desired temperature for releasing the amines, e.g., based on other system conditions.

The pressure of the system during release can be atmospheric (about 100 kPaa), or the $CO_2$ (and/or $H_2S$) can be released at an elevated pressure, such as a pressure from about 0.1 barg (about 10 kPag) to about 10 barg (about 1 MPag), preferably including at least about 1 barg (about 100 kPag) or at least about 2 barg (about 200 kPag). In a conventional capture and release system, the pressure can be reduced to as low a pressure as possible to facilitate release of the captured gas(es). This can be done in part to avoid excess heating of the amine, which could lead to an increased loss of amine due to a higher vapor pressure. With a supported amine, the vapor pressure of the amine in the release volume can advantageously remain low, substantially independent of temperature, at least in the range of about 80° C. to about 200° C. Thus, the temperature can be increased to allow additional release and/or faster release with minimal or no loss of the supported amine functionality. Releasing captured gas(es) at an elevated pressure can be beneficial to reduce energy consumption. The capture process can be conducted at a pressure above ambient. After release, the captured gas(es) can eventually be pressurized up to about 100 barg (about 10 MPag) for storage. Maintaining at least a portion of the pressure used during the capture process can avoid having a separate depressurization followed by a separate repressurization. Instead, any pressure available after the capture and transfer processes can be preserved to reduce the amount of additional pressurization needed for the exiting $CO_2/H_2S$ stream.

After releasing the $CO_2$ and/or $H_2S$, the supported amine particles can be returned to the capture process/volume for another cycle of capture and release. During this second transfer, the temperature of the supported amine particles can be reduced, so that the supported amine slurry can have the desired temperature for the capture process. One option for cooling the supported amine particles after release can include using a heat exchanger to transfer heat from the regenerated supported amine particles to the rich supported amine slurry being transferred to the release process. The cooled supported amine particles can then be reincorporated/added into the slurry. Other heat exchangers and/or other heating methods can be used to adjust the temperature of the slurries or particles.

Other Embodiments

Additionally or alternately, the present invention can include one or more of the following embodiments.

Embodiment 1

A method for performing a gas separation, comprising: contacting a gas stream comprising $CO_2$, $H_2S$, or a combination thereof with an aqueous slurry of supported amine particles under effective conditions for capturing at least one of $CO_2$ and $H_2S$ to form a slurry of supported amine particles enriched in $CO_2$, $H_2S$, or a combination thereof; separating the supported amine particles from at least a portion of the aqueous slurry liquid; exposing the separated supported amine particles to effective conditions for release of a release gas, the release gas comprising at least a portion of the captured at least one of $CO_2$ and $H_2S$, the effective conditions for release including a temperature of about 80° C. to about 200° C.; and combining the supported amine particles with aqueous slurry liquid to form a second aqueous slurry of supported amine particles.

Embodiment 2

The method of embodiment 1, wherein at least a portion of the second aqueous slurry of supported amine particles is used as the aqueous slurry of supported amine particles for said contacting of the gas stream.

Embodiment 3

The method of embodiment 1 or embodiment 2, wherein the effective conditions for capturing at least one of $CO_2$ and $H_2S$ comprise a temperature of about 20° C. to about 80° C., the temperature preferably being at least about 60° C. lower than the temperature of the effective conditions for release.

Embodiment 4

The method of any one of the previous embodiments, wherein the effective conditions for release further comprise a pressure of about 2 barg (200 kPag) to about 10 barg (1000 kPag).

Embodiment 5

The method of any one of the previous embodiments, wherein the supported amine particles comprise an amine compound supported on a support that comprises silica.

Embodiment 6

The method of embodiment 5, wherein the amine compound comprises an amine polymer, a cross-linked amine polymer, or an amine compound bonded to the support by a siloxane linkage.

Embodiment 7

The method of embodiment 6, wherein the amine compound bonded to the support comprises an alkoxysilylalkyl compound prior to bonding to the support.

Embodiment 8

The method of any one of the previous embodiments, wherein the supported amine particles comprise an ion exchange resin that contains one or more amine functional groups.

Embodiment 9

The method of any one of the previous embodiments, wherein separating the supported amine particles from the aqueous slurry liquid comprises performing one or more density based separations to form an output containing a majority of the supported amine particles.

Embodiment 10

The method of any one of the previous embodiments, wherein separating the supported amine particles further comprises dewatering the output containing the majority of the supported amine particles.

Embodiment 11

The method of any one of the previous embodiments, wherein the aqueous slurry of supported amine particles and the gas stream are contacted in a co-current manner.

Embodiment 12

The method of any one of the previous embodiments, wherein the release gas has an amine concentration of about 100 wppm or less.

Embodiment 13

The method of any one of the previous embodiments, wherein contacting the gas stream with the aqueous slurry of supported amine particles further comprises generating a contacted gas stream having a reduced content of $CO_2$ relative to the gas stream prior to contacting, the contacted gas stream having an amine content of 100 wppm or less.

Embodiment 14

A method for performing a gas separation, comprising: contacting a gas stream comprising $CO_2$, $H_2S$, or a combination thereof with an aqueous slurry of supported amine particles in a co-current manner under effective conditions for capturing at least one of $CO_2$ and $H_2S$ to form a slurry of supported amine particles enriched in $CO_2$, $H_2S$, or a combination thereof; separating the supported amine particles from at least a portion of the aqueous slurry liquid; exposing the separated supported amine particles to effective conditions for release of a release gas, the release gas comprising at least a portion of the captured at least one of $CO_2$ and $H_2S$, the effective conditions for release including a temperature of about 100° C. to about 140° C. and a pressure of about 2 barg (200 kPag) to about 10 bar (1000 kPag); and combining the supported amine particles with aqueous slurry liquid to form a second aqueous slurry of supported amine particles, at least a portion of the second aqueous slurry of supported amine particles being used as the aqueous slurry of supported amine particles for said contacting of the gas stream, wherein the effective conditions for capturing at least one of $CO_2$ and $H_2S$ comprise a temperature at least about 60° C. lower than the temperature of the effective conditions for release, and wherein contacting the gas stream with the aqueous slurry of supported amine particles further comprises generating a contacted gas stream having a reduced content of $CO_2$ relative to the gas stream prior to contacting, the contacted gas stream having an amine content of 100 wppm or less.

EXAMPLES

Example 1

Reaction System

The following is an example of an apparatus believed to be suitable for performing capture and release processes on a gas feed containing $CO_2$ and/or $H_2S$. This embodiment is also schematically shown in FIG. 1.

In FIG. 1, a flue gas 102 containing at least one of $CO_2$ and $H_2S$ can be passed into a contactor 110. A slurry 162 of supported amine particles (such as a regenerated slurry) can also be introduced into the contactor 110. In FIG. 1, the flue gas 102 and regenerated slurry 162 are shown as being introduced in a co-current manner, but a counter-current arrangement could alternately be used. In contactor 110, $CO_2$ and/or $H_2S$ from flue gas 102 can be captured by the supported amines in slurry 162. This can result in a rich slurry 115 enriched in at least one of $CO_2$ and $H_2S$. The remaining portion 118 of flue gas 102 not captured by the supported amines in slurry 162 can be separated from rich slurry 115 using a gas-liquid separator or other suitable separator 117. The other gases 118 from the flue gas can then be used for appropriate purposes. For example, a refinery flue gas may have a sufficient hydrogen and light hydrocarbon content to be used as a fuel gas within the refinery.

After separation, the separated rich slurry 119 can then be passed into one or more stages of density-based separation devices 120 to separate the supported amine particles 125 from at least a portion of the liquid slurry medium (such as water) 126. A cyclone separator is one example of a density based separation device 120. Optionally, an additional dewatering stage 130 may be used to remove additional liquid slurry medium 127 from the supported amine particles. The (optionally) dewatered particles 135 can then be passed through a heat exchanger 133, e.g., to provide part of the temperature increase to be used for release of the captured $CO_2$ and/or $H_2S$. Additional heat can be added in a heating stage 139. The heated, dewatered particles can then be passed into a regeneration volume 140. In regeneration volume 140, the supported amine particles can be heated to a temperature between about 100° C. and about 150° C. to release any captured $CO_2$ and/or $H_2S$. It is not required that all of the captured $CO_2$ and/or $H_2S$ is released. However, within the temperature range of the regeneration volume 140, the release of captured gases is not necessarily constrained by concerns about loss of amines or about maintaining an appropriate phase for the amines. The released $CO_2$ and/or $H_2S$ can then be exhausted in line 147 from regeneration volume 140 for disposal or further processing. For example, exhausted $CO_2$ can be compressed to form a liquid and then injected into a below ground reservoir. If $H_2S$ is present in addition to $CO_2$, the $H_2S$ may be separated therefrom and sent to a Claus plant for formation of a solid sulfur product.

After release of the captured gases, the regenerated supported amine particles can be returned via line 145 for further capture of gases. The regenerated supported amine particles in line 145 can pass through heat exchanger 133 before being exposed to an additional cooling stage 150, e.g., to lower the temperature of the regenerated particles to the temperature desired for the contacting (capture) stage 110. The regenerated particles can then be mixed 160 with slurry liquid medium 161, to form supported amine slurry 162. Optionally, a slip stream (not shown) of the regenerated particles can be withdrawn at any convenient location prior to introduction into contactor 110. This can allow a fresh portion of supported amine particles to be added to the overall slurry, so that the slurry can be continuously and/or intermittently refreshed with new supported amine particles.

As noted above, a $CO_2$ output in a flue gas from a power plant of about 50 kg/sec corresponds to roughly 1100-1150 moles of $CO_2$ per second. In order to capture this amount of $CO_2$, an appropriate amount of supported amine can be used. During contacting of amine particles with $CO_2$ in a contactor or contacting stage, the supported amine particles can preferably be in the form of a slurry to improve the flow properties of the supported amine particles. In order to maintain desirable flow properties, the solids content of the slurry can be about 50 wt % or less. For particles that are heavily loaded with supported amines, an adsorption capacity of up to about 3 mmol $CO_2$ per gram of slurry can likely be achievable. From a process control standpoint, reducing the amine loading on the particles and/or the solids content of the slurry may be beneficial, and it may additionally or alternately be beneficial to operate the contactor and regeneration stages so that less than 100% capture and/or release can be achieved. As a result, an adsorption capacity closer to at least ~1.0 or 1.5 mmol $CO_2$ per gram of slurry during a capture/release cycle may be preferred. At this range of adsorption capacities, a slurry flow rate of about 1000 kg/sec would be suitable for capturing $CO_2$ emissions on the order of ~50 kg/sec.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for performing a gas separation, comprising:
contacting a gas stream comprising $CO_2$, $H_2S$, or a combination thereof with an aqueous slurry of supported amine particles in a co-current manner under effective conditions for capturing at least one of $CO_2$ and $H_2S$ to form a slurry of supported amine particles enriched in $CO_2$, $H_2S$, or a combination thereof;
separating the supported amine particles from at least a portion of the aqueous slurry liquid;
exposing the separated supported amine particles to effective conditions for release of a release gas, the release gas comprising at least a portion of the captured at least one of $CO_2$ and $H_2S$, the effective conditions for release including a temperature of about 100° C. to about 140° C. and a pressure of about 2 barg (200 kPag) to about 10 barg (1000 kPag); and
combining the supported amine particles with aqueous slurry liquid to form a second aqueous slurry of supported amine particles, at least a portion of the second aqueous slurry of supported amine particles being used as the aqueous slurry of supported amine particles for said contacting of the gas stream,
wherein the effective conditions for capturing at least one of $CO_2$ and $H_2S$ comprise a temperature at least about 60° C. lower than the temperature of the effective conditions for release, and
wherein contacting the gas stream with the aqueous slurry of supported amine particles further comprises generating a contacted gas stream having a reduced content of $CO_2$ relative to the gas stream prior to contacting, the contacted gas stream having an amine content of 100 wppm or less.

2. The method of claim 1, wherein the effective conditions for capturing at least one of $CO_2$ and $H_2S$ comprise a temperature of about 20° C. to about 80° C.

3. The method of claim 1, wherein the supported amine particles comprise an ion exchange resin that contains one or more amine functional groups.

4. The method of claim 1, wherein the supported amine particles comprise an amine compound supported on a support that comprises silica.

5. The method of claim 4, wherein the amine compound comprises an amine compound bonded to the support, the amine compound comprising an alkoxysilylalkyl compound prior to bonding to the support.

6. The method of claim 1, wherein the release gas has an amine concentration of about 100 wppm or less.

7. A method for performing a gas separation, comprising:
contacting a gas stream comprising $CO_2$, $H_2S$, or a combination thereof with an aqueous slurry of supported amine particles under effective conditions for capturing at least one of $CO_2$ and $H_2S$ to form a slurry of supported amine particles enriched in $CO_2$, $H_2S$, or a combination thereof; wherein the effective conditions for capturing at least one of $CO_2$ and $H_2S$ comprise a temperature of about 20° C. to about 80° C.;
separating the supported amine particles from at least a portion of the aqueous slurry liquid;
exposing the separated supported amine particle to effective conditions for release of a release gas, the release gas comprising at least a portion of the captured at least one of $CO_2$ and $H_2S$, the effective conditions for release including a temperature of about 80° C. to about 200° C.; and combining the supported amine particles with aqueous slurry liquid to form a second aqueous slurry of supported amine particles.

8. The method of claim 7, wherein at least a portion of the second aqueous slurry of supported amine particles is used as the aqueous slurry of supported amine particles for said contacting of the gas stream.

9. The method of claim 7, wherein the effective conditions for capturing at least one of $CO_2$ and $H_2S$ comprise a temperature at least about 60° C. lower than the temperature of the effective conditions for release.

10. The method of claim 7, wherein the effective conditions for release further comprise a pressure of about 2 barg (200 kPag) to about 10 barg (1000 kPag).

11. The method of claim 7, wherein the supported amine particles comprise an amine compound supported on a support that comprises silica.

12. The method of claim 11, wherein the amine compound comprises an amine polymer, a cross-linked amine polymer, or an amine compound bonded to the support by a siloxane linkage.

13. The method of claim 12, wherein the amine compound bonded to the support comprises an alkoxysilylalkyl compound prior to bonding to the support.

14. The method of claim 7, wherein the supported amine particles comprise an ion exchange resin that contains one or more amine functional groups.

15. The method of claim 7, wherein separating the supported amine particles from the aqueous slurry liquid comprises performing one or more density based separations to form an output containing a majority of the supported amine particles.

16. The method of claim 15, wherein separating the supported amine particles further comprises dewatering the output containing the majority of the supported amine particles.

17. The method of claim 7, wherein the aqueous slurry of supported amine particles and the gas stream are contacted in a co-current manner.

18. The method of claim 7, wherein the release gas has an amine concentration of about 100 wppm or less.

19. The method of claim 7, wherein contacting the gas stream with the aqueous slurry of supported amine particles further comprises generating a contacted gas stream having a reduced content of $CO_2$ relative to the gas stream prior to contacting, the contacted gas stream having an amine content of 100 wppm or less.

* * * * *